US006917692B1

(12) United States Patent
Murching et al.

(10) Patent No.: US 6,917,692 B1
(45) Date of Patent: Jul. 12, 2005

(54) KALMAN TRACKING OF COLOR OBJECTS

(75) Inventors: Anil M. Murching, Beaverton, OR (US); Thumpudi Naveen, Beaverton, OR (US); Radu S. Jasinschi, Portland, OR (US); Ali Tabatabai, Beaverton, OR (US)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/318,682

(22) Filed: May 25, 1999

(51) Int. Cl.[7] .................................................. G06K 9/00

(52) U.S. Cl. ........................ 382/103; 382/164; 348/172

(58) Field of Search ................................ 382/162–167, 382/168–173, 176–180, 283, 224, 225, 276, 199, 103, 106, 107; 358/504–551, 462, 464; 345/547–625; 348/172, 169, 155, 208.14, 173

(56) References Cited

U.S. PATENT DOCUMENTS

| | | | | | |
|---|---|---|---|---|---|
| 5,051,751 | A | * | 9/1991 | Gray | 342/107 |
| 5,280,530 | A | * | 1/1994 | Trew et al. | 382/103 |
| 5,293,574 | A | * | 3/1994 | Roehm et al. | 378/98.2 |
| 5,469,374 | A | * | 11/1995 | Graham et al. | 342/159 |
| 5,719,951 | A | * | 2/1998 | Shackleton et al. | 382/118 |
| 5,768,412 | A | * | 6/1998 | Mitsuyama et al. | 382/173 |
| 5,852,792 | A | * | 12/1998 | Nielson | 701/222 |
| 5,933,524 | A | * | 8/1999 | Schuster et al. | 382/168 |
| 5,960,097 | A | * | 9/1999 | Pfeiffer et al. | 382/103 |
| 6,044,165 | A | * | 3/2000 | Perona et al. | 382/186 |
| 6,148,092 | A | * | 11/2000 | Qian | 382/190 |
| 6,167,167 | A | * | 12/2000 | Matsugu et al. | 382/283 |
| 6,188,776 | B1 | * | 2/2001 | Covell et al. | 382/100 |
| 6,198,833 | B1 | * | 3/2001 | Rangan et al. | 382/103 |
| 6,246,803 | B1 | * | 6/2001 | Gauch | 382/276 |
| 6,278,460 | B1 | * | 8/2001 | Myers et al. | 345/424 |
| 6,381,363 | B1 | * | 4/2002 | Murching et al. | 382/164 |
| 6,404,900 | B1 | * | 6/2002 | Qian et al. | 382/103 |
| 6,526,169 | B1 | * | 2/2003 | Murching et al. | 382/168 |
| 6,711,278 | B1 | * | 3/2004 | Gu et al. | 382/103 |

* cited by examiner

*Primary Examiner*—Bhavesh M. Mehta
*Assistant Examiner*—Sheela Chawan
(74) *Attorney, Agent, or Firm*—Joseph S. Tripoli; Joseph J. Laks; Robert B. Levy

(57) ABSTRACT

A semi-automatic method of tracking color objects in a video image sequence starts by separating the objects on the basis of color and identifying an object of interest to track. A Kalman predictive algotithm in used to predict the position of the centroid of the object of interest through successive frames. From the predicted position the actual centroid is measured and the position and velocity are smoothed using a Kalman filter. Error recovery is provided in the event the centroid falls outside the field of view or falls into an area of a different color, or in the event the tracking algorithm breaks down.

10 Claims, 4 Drawing Sheets

VIDEO IMAGE SEQUENCE

INITIALIZE FOR $I_0$ IDENTIFY OBJECT #K & CENTROID POSITION

FOR $I_n = 0 \rightarrow M$

SEPARATE OBJECTS BY COLOR

PREDICT CENTROID OF OBJECT #K IN FRAME $I_{n+1}$

MEASURE CENTROID IN $I_{n+1}$ USING MASS DENSITY FUNCTION

NOISE FILTER

CENTROID POSITION & VELOCITY IN $I_{n+1}$

NEIGBORHOOD
SPIRAL SEARCH

KALMAN TRACKING OF COLOR OBJECTS

BACKGROUND OF THE INVENTION

The present invention relates to the processing of video image sequences, and more particularly to a semi-automatic method for Kalman tracking of color objects within the video image sequence.

With the advent of digital television and the resulting large bandwidth requirements for baseband video signals, compression techniques become ever more important. The currently accepted standard for television compression that provides the most compression while still resulting in acceptable decoded images is the MPEG2 standard. This standard compresses an image using one of three types of compressed frames—an Independently compressed frame, a predictively compressed frame and a bi-directional predictively compressed frame. This standard operates on the images as a whole.

However the content of images may be composed of several objects, such as tennis players and a ball, in front of a background, such as spectators. It is posited that if the objects (tennis players and ball) are separated out from the background (spectators), then the objects may be compressed separately for each frame, but the background only needs to be compressed once since it is relatively static. To this effect many techniques have been proposed for separating objects from the background, as indicated in the recently published proposed MPEG7 standard.

Just separating the objects is not sufficient—the objects need to be tracked throughout a given sequence of images that make up a scene. What is desired is a method for tracking objects within a video image sequence.

BRIEF SUMMARY OF THE INVENTION

Accordingly the present invention provides Kalman tracking of color objects within a video image sequence. Objects are separated on the basis of color using a color separator, and a user identifies an object or objects of interest. The object(s) are tracked using a Kalman prediction: algorithm to predict the location of the centroid of the object(s) in successive frames, with the location being subsequently measured using a mass density function and then filtered to provide a smooth value for centroid location and velocity. If one of the assumptions for the tracking algorithm fails, then an error recovery scheme is used based upon the assumption that failed, or the user is asked to re-initialize in the current frame.

The objects, advantages and other novel features of the present invention are apparent from the following detailed description when read in conjunction with the appended claims and attached drawing.

DETAILED DESCRIPTION OF THE INVENTION

Figure 1:
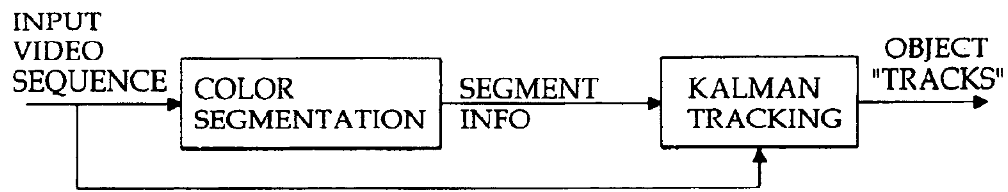
FIG. 1 is a basic block diagram view of an algorithm for Kalman tracking of color objects according to the present invention.

In performing semi-automatic tracking of colored objects in a given video image sequence, a user indicates in one or more key frames a set of one or more colored objects. The user also indicates other regions of significant size and different colors in the video image sequence. The objects are separated based upon color, and a tracking algorithm then tracks the movements of the indicated objects over time through the video image sequence. This tracking is achieved by associating a Kalman tracking model to each object. The basic algorithm is shown in FIG. 1.

An input video Image sequence is input to a color segmentation algorithm, such as that described in co-pending U.S. patent application Ser. No. 09/270,233 filed Mar. 15, 1999 by Anil Murching et al entitled "Histogram-Based Segmentation of Objects from a Video Signal Via Color Moments". This algorithm uses a hierarchical approach using color moment vectors. The color segmentation algorithm segments the images in the input video image sequence Into regions/classes of uniform color properties. Then a Kalman tracking algorithm is applied to each of the segmented objects to produce object "tracks" from one frame to the next of the video image sequence.

Figure 2:
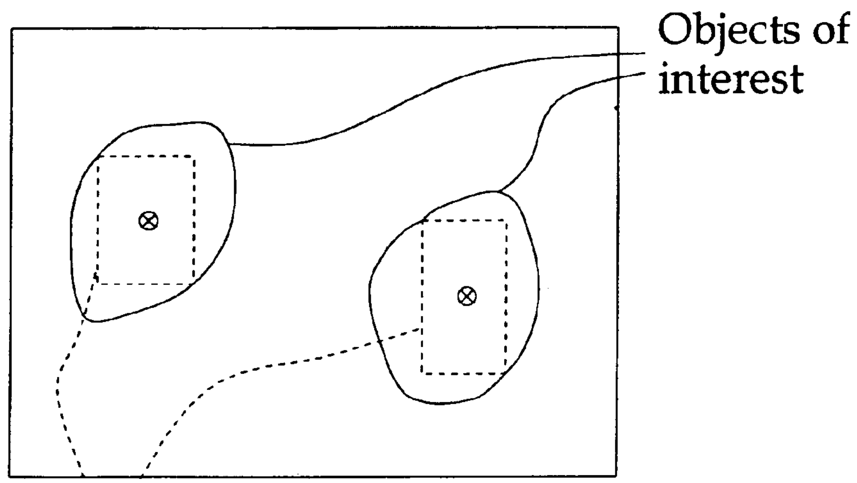
FIG. 2 is an illustrative view for separating objects by color according to the present invention.

As shown in FIG. 2 color segmentation is performed using key rectangles that the user places within different objects of interest, as well as other regions that have significant size and are different in color from the objects. If there are a total of Nu different colors indicated by the user, then the color segmentation algorithm classifies each small block P×Q (P=Q=2 pixels, for example) of each frame of the input video image sequence into one among the $N_u$ classes or into a "garbage" class. Kalman tracking may be thought of as a post-processing operation on this segmentation result.

Figure 3:
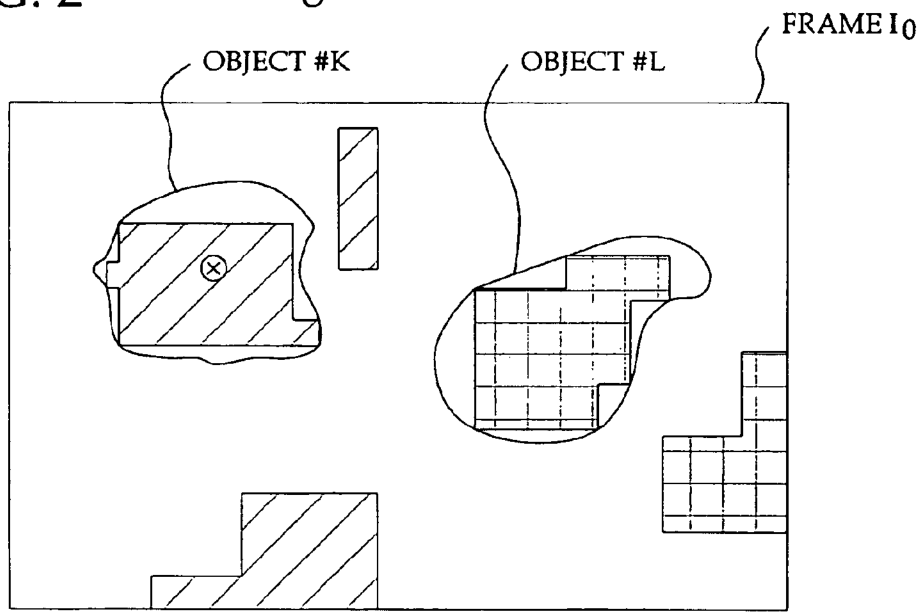
FIG. 3 is an illustrative view of the final separation by color according to the present invention.
Figure 4:
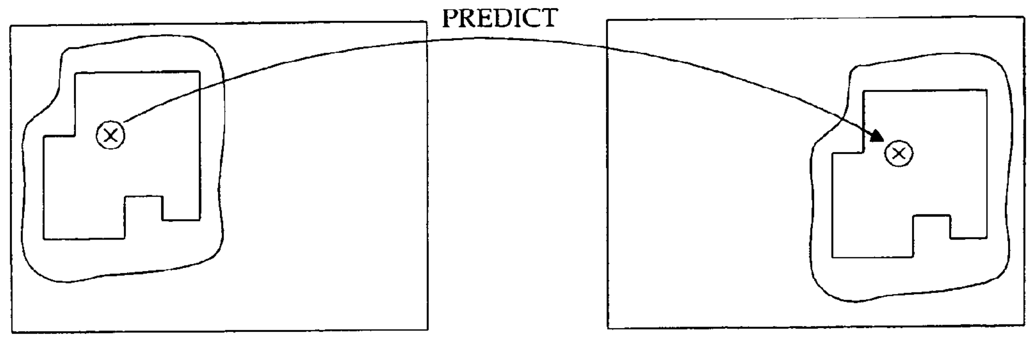
FIG. 4 is an illustrative view of Kalman prediction of an object centroid from frame to frame according to the present invention.

Kalman tracking applies a Newtonian motion model to the centroide of the objects of interest. As an example, the objective is to track object #K in FIG. 3, whose location in the starting frame $I_D$ of the input video image sequence is identified by the user. Object #K belongs to color model #A while a different object #L belongs to color model #B. The user "clicks" on the estimated location of the centroid (geometric center) of the object #K and thereby identified the object #K as an object of interest. The Kalman state vector at time "n" is:

$$\zeta_k[n]\Delta\begin{vmatrix} x_k[n] \\ y_k[n] \\ v_{xk}[n] \\ v_{yk}[n] \end{vmatrix}$$

where $(x_k, Y_k)$ are the location coordinates of the centroid for object #K, and $(v_{xk}, v_{yk})$ are the velocity components of object #K. The Newtonian motion model for all objects assumes that acceleration is a white-noise process. This motion model is well known in the art and may be found in the literature on Kalman filtering.

With this motion model a state-transition equation becomes:

$$\zeta_k[n+1]=F\,\zeta_k[n]+G\eta_k^s[n]$$

where F and G are vector constants and $\eta_k^s[n]$ is a stationary, independent, white noise vector with mean: $E\{\eta_k^s[n]\}=0$.

A correlation vector bandwidth $R_k^s=E\{\eta_k^s[n]\eta_k[m]^T\}=|\sigma_{xk}^2, 0; 0, \sigma_{yk}^2|$. The noise variances are estimated from the input video sequence.

Through tracking, the position of the centroid of the object #K in the next frame is measured, so:

$$\Psi_k[n+1]=H\zeta_k[n+1]+\eta_k^o[n+1]$$

where $\eta_k^0[n]$ is the stationary, independent, observation noise vector with means equal to 0, and H is a vector constant. Again there is a correlation vector $R_k^o$ with noise variances that are estimated.

In steady state tracking the object #K has been tracked to frame $I_n$ and its position and velocity are known. From this point the first step is Kalman prediction. To locate the object #K in frame $I_{n+1}$ $$(\text{Predicted})\zeta_k'[n+1|n]=F(\text{filtered})\zeta_k''[n|n]$$

The first two entries in $\zeta_k'[n+1|n]$ give the predicted position of the centroid in frame $I_{n+1}$, Segment P×Q blocks of $I_{n+1}$ into the many colors and identify all the blocks that belong to color model #A—object #K has this color. Then starting from the predicted position, extract a connected set of P×Q blocks that all belong to the color model #A.

The set of connected blocks identified in the first step constitute the desired detection/tracking of the object of interest in frame $I_{n+1}$. The second step is to measure the centroid position, performed by:

$$_{105}\ x_k[n+1]=\Sigma X_kY_k/\Sigma Y_k$$

$$_{105}\ y_k[n+1]=\Sigma y_kY_k/\Sigma Y_k$$

where Y is luminance data in frame $I_{n+1}$. Calculate the centroid position by using luminance as a "mass density" function. This improves the robustness of the tracking algorithm. Either of the color components may also be used as mass density functions.

Both the measurement and prediction steps are susceptible to noise, so a third step is to filter/smooth the state information. The familiar Kalman filtering equations are used:

$$\zeta_k''[n+1|n]=\zeta_k'[n+1|n]+\Sigma_k[n+1|n]H^T(H\Sigma_k[n+1|n]H^T+R_k^0)^{-1}*(\Psi_k[n+1]-H\zeta_k'[n+1|n])$$

$$\Sigma_k[n+1|n+1]=\Sigma_k[n+1|n]-\Sigma_k[n+1|n]H^T(H\Sigma_k[n+1|n]H^T+R_k^0)^{-1}*H^T\Sigma_k[n+1|n]$$

$$\Sigma_k[n+1|n]=F\,\Sigma_k[n|n]F^T+G\,R_k^sG^T$$

From these equations the filtered/smoothed position and velocity of the centroid of object #K in frame $I_{n+1}$ are obtained. The same process is repeated for each succeeding frame.

For the initialization of the process the position of the centroid in frame $I_0$, $\zeta_k''[0|0]$, is determined. The user "clicks" near the visually estimated geometric center of the object #K, and that point serves as the initial position. The initial velocity is set to zero. Then values for $R_k^s$, $R_k^o$ and $\Sigma_k[0|0]$ are determined experimentally and used to determine the centroid position. One such set is $R_k^s=|2.0, 0; 0, 8.0|$; $R_k^0=0; 0, 2|$; $\Sigma_k[0|0]=|1.6, 0, 0, 0; 0, 3.2, 0, 0; 0, 0, 2.0, 0; 0. 0, 0, 4.0|$ Although the above equations ostensibly give the predicted position of the centroid of object #K in the new frame $I_{n+1}$, it is possible that these coordinates lie outside the image field of view. This is easily detected and is an indication to the user that the object of interest has exited the field of view, which is a perceptually significant event. In the algorithm above use the last known "good" position and attempt to delete the object In frame $I_{n+1}$ at that location. If successful, the algorithm continues. Otherwise the algorithm prompts the user to either (a) verify that the object has left the field of view, and hence stop tracking it, or (b) re-initialize at frame $I_{n+1}$ because the tracker model has broken down.

Figure 5:
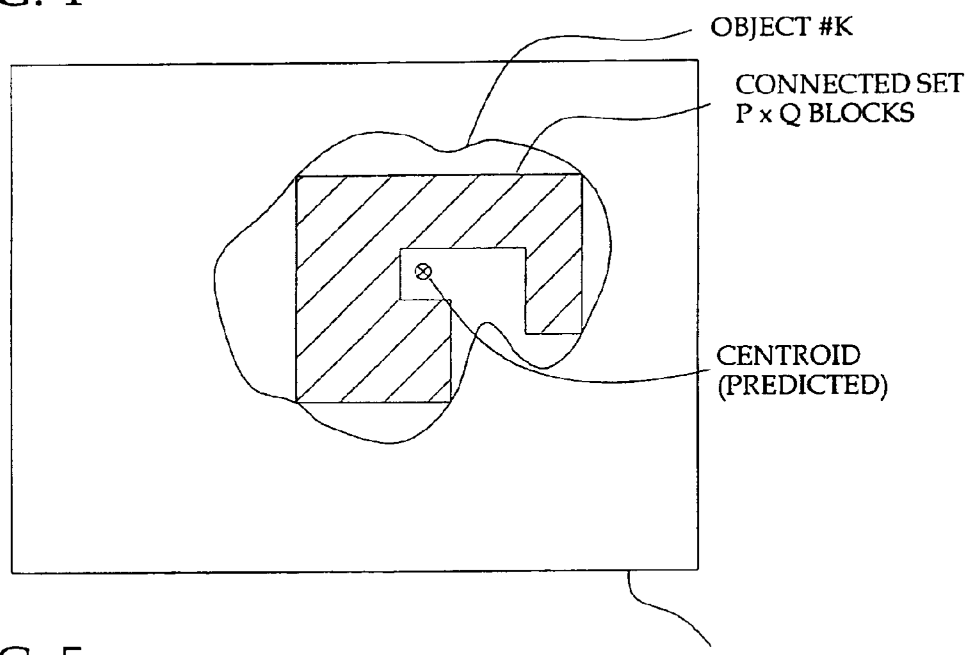
FIG. 5 is an illustrative view of one type of failure of the tracking algorithm requiring error recovery according to the present invention.
Figure 6:
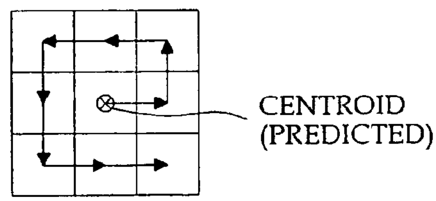
FIG. 6 is an illustrative view of a search pattern for locating the object shown in FIG. 5 according to the present invention.
Figure 7:
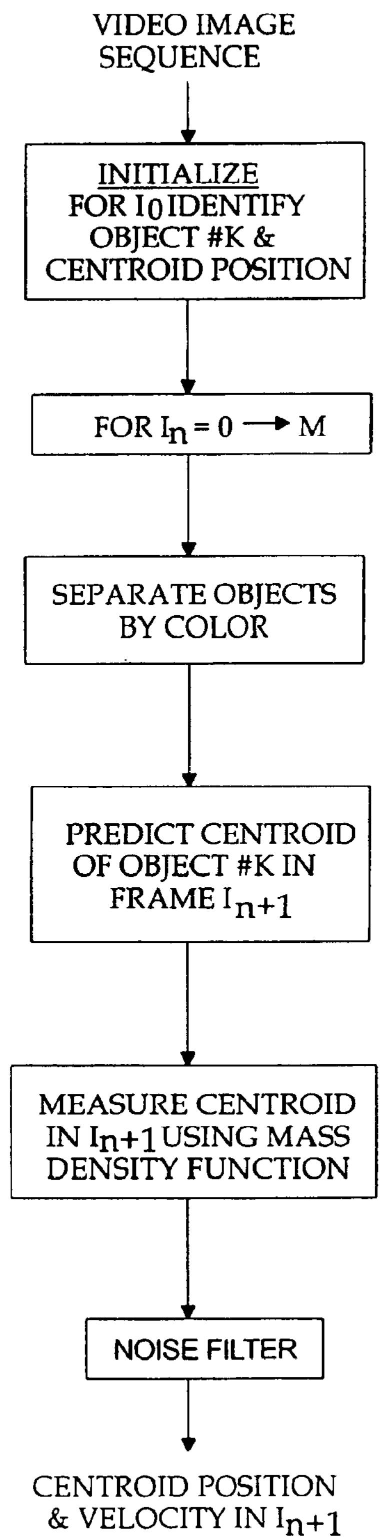
FIG. 7 is a more detailed block diagram view of the Kalman tracking algorithm according to the present invention.

Sometimes, due to the geometric shape of the object or due to sudden changes in acceleration, the Kalman prediction points to a centroid location that is outside the boundary of the object #K, as shown in FIG. 5. This situation arises when the P×Q block that contains the predicted centroid position is classified by the color segmentation algorithm as belonging to a class other than color model #A. Again this situation is easily detected. To recover from this, search around a local neighborhood of the predicted centroid position. As shown in FIG. 6, begin at the P×Q block that contains the predicted centroid position and examine P×Q blocks in a spiral search pattern until one is found that belongs to color model #A. Then grow a connected region around this block and label it as object #K in frame $I_{n+1}$. The radius of the spiral search is a parameter that may be adjusted for each input video image sequence. If the objects of interest move slowly and are "convex" in shape, then a small search radius, such as a 5×5 neighborhood, is generally sufficient. If there is rapid and random motion, then a larger search range is desired.

The Kalman tracking algorithm is based upon the following assumptions: (I) objects of interest have regular shapes, i.e., cannot track spokes of a bicycle wheel as they are too "thin"; (ii) objects of interest have smooth color, i.e., no stripes or strange patterns; (iii) objects are moving "regularly", i.e., not Brownian motion of gas molecules; and (iv) objects do not occlude each other. When both the out of field of view and outside object boundary error recovery schemes described above fail, then the Kalman tracker is said to have failed. At this point one of the above assumptions has failed. The options at this point are (I) detect all connected regions in frame $I_{n+1}$, that have color model #A, sort according to size/shape and try to locate the desired object #K among them, or (II) ask the user for help, i.e., prompt the user to re-initialize the tracking algorithm at frame $I_{n+1}$.

Figure 8:
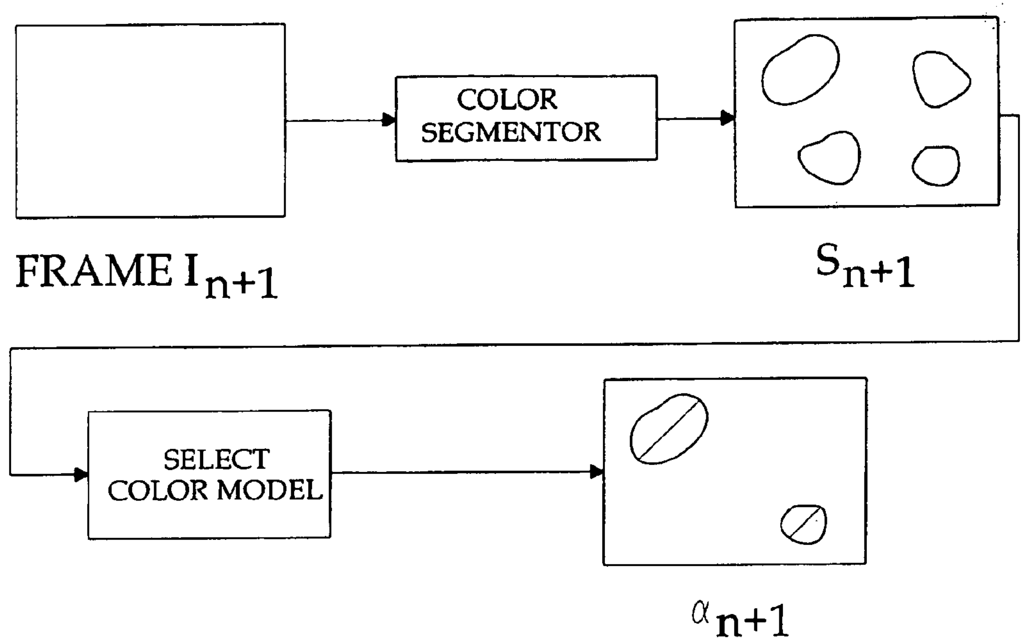
FIG. 8 is an illustrative view of developing an alpha map for error recovery according to the present invention.
Figure 9:
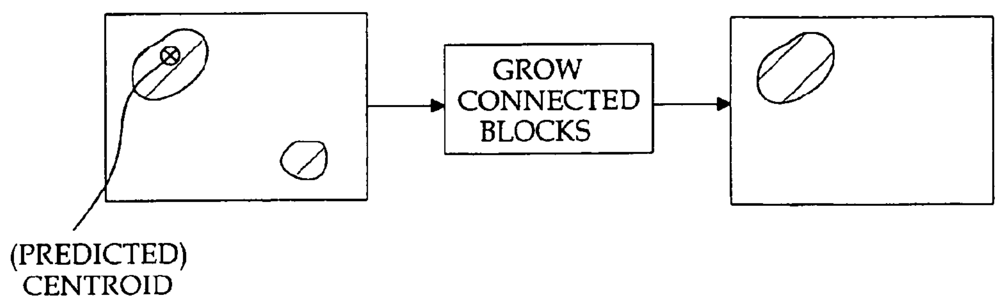
FIG. 9 is an illustrative view of defining the object around the predicted centroid as part of error recovery according to the present invention.

For option (I) the color segmentor outputs a segmentation map $S_{n+1}$. See FIG. 8. Each sample in $S_{n+1}$ represents a spatially corresponding P×Q block of frame $I_{n+1}$. The value of the sample "n" is $\{0, 1, \ldots, N_u\}$, where $\{1, \ldots, N_u\}$ are the color models provided to the color segmentor and $\{0\}$ represents "garbage". The segmentation map is converted to a binary alpha map $\alpha_{n+1}$ by tagging all samples as $S_{n+1}$ that have the same color model as object #K. Thus pixels in $\alpha_{n+1}$ have a value 255 if their corresponding P×Q block in $I_{n+1}$ has the same color as object #K, and have a value of 0 otherwise. The alpha map is fed to a "grow connections" algorithm (FIG. 9) along with the block coordinates of the predicted position of the centroid of object #K. The output is the desired connected region that is tagged as the object of interest. A simple error recovery scheme begins by detecting all connected regions in frame $I_{n+1}$ that have the same color as object #K, and then selects the biggest one among them.

Thus the present invention provides for Kalman tracking of color objects in an input video image sequence by segmenting the image in the initial frame into a group of objects according to color, determining the position of the centroid of an object of interest and tracking the object through successive frames; and also provides some simple error recovery schemes if the object moves out of the field of view, the predicted centroid falls outside the boundaries of the object or the algorithm breaks down.

What is claimed is:

1. A method of performing semi-automatic tracking of colored objects within a video image sequence comprising the steps of:

separating objects within an initial frame of the video image sequence on the basis of color;

receiving a user-provided input that selects an object of interest from the separated objects by a user identifying a centroid of the object of interest; and tracking the object of interest through successive frames of the video image sequence using a Kalman predictive algorithm applied to the centroid.

2. The method as recited in claim 1 wherein the tracking step comprises the steps of:

from the initial frame determining a position and velocity for the centroid;

for each successive frame predicting a position of the centroid;

from the predicted position extracting a connected group of blocks that belong to the object of interest;

measuring the position of the centroid in the successive frame from the connected group of blocks; and smoothing the measured position and velocity of the centroid.

3. The method as recited in claim 1 further comprising the steps of:

detecting whether the centroid in the successive frame is within the object of interest and field of view; and applying an error recovery scheme to re-identify the object of interest in the successive frame.

4. A method of tracking a colored object moving relative to a background within a sequence of video image frames, comprising the steps of:

(a) in an initial frame of the sequence, separating objects from the background based on color;

(b) selecting a separated object by a user identifying a reference point within a boundary of the separated object; and (c) tracking the selected object through successive frames of the video image sequence using a Kalman predictive algorithm applied to the reference point.

5. The method according to claim 4, wherein step (c) includes the steps of determining the position of a centroid of the selected object and applying the Kalman predictive algorithm to the centroid.

6. The method according to claim 4, wherein step (c) includes the steps of determining the position of a centroid based on a color function of the selected object and applying the Kalman predictive algorithm to the centroid.

7. The method according to claim 4, wherein step (c) includes the steps of determining the position of a centroid based on luminance of the selected object and applying the Kalman predictive algorithm to the centroid.

8. The method according to claim 4, wherein each image frame is resolved into multiple blocks and step (a) comprises the step of segmenting the initial frame based on color of the blocks.

9. The method according to claim 8, wherein step (b) includes the step of identifying a color model to which the selected object belongs and step (c) includes the steps of:

predicting the position of a centroid of the selected object in a subsequent frame;

determining whether the predicted position of the centroid in said subsequent frame is within a boundary of the selected object in said subsequent frame; and in the event that the predicted position of the centroid in said subsequent frame is not within the boundary of the selected object in said subsequent frame, carrying out a search to identify a block that belongs to the selected color model.

10. The method according to claim 4, wherein each image frame is resolved into multiple blocks and step (c) comprises the steps of:

determining position and velocity of a centroid of the selected object in the initial frame;

predicting the position of the centroid in a subsequent frame;

from the predicted position of the centroid in said subsequent frame, extracting a connected group of blocks in said subsequent frame that belong to the selected object; and calculating the position of the centroid of the selected object in said subsequent frame from the connected group of blocks.

* * * * *